United States Patent
Liu et al.

(10) Patent No.: US 11,997,763 B2
(45) Date of Patent: May 28, 2024

(54) DISTRIBUTED COMPUTING NETWORK SYSTEM AND METHOD

(71) Applicant: UISEE TECHNOLOGIES (BEIJING) LTD., Beijing (CN)

(72) Inventors: Xiaotong Liu, Beijing (CN); Wei Lin, Beijing (CN); Wei Feng, Beijing (CN); Yu Zhang, Beijing (CN); Lei Shi, Beijing (CN)

(73) Assignee: UISEE TECHNOLOGIES (BEIJING) LTD., Beijing (CN)

( * ) Notice: Subject to any disclaimer, the term of this patent is extended or adjusted under 35 U.S.C. 154(b) by 447 days.

(21) Appl. No.: 17/359,566

(22) Filed: Jun. 27, 2021

(65) Prior Publication Data

US 2021/0400770 A1 Dec. 23, 2021

Related U.S. Application Data

(63) Continuation of application No. PCT/CN2018/124471, filed on Dec. 27, 2018.

(51) Int. Cl.
*H04W 92/02* (2009.01)
*G06F 9/48* (2006.01)
(Continued)

(52) U.S. Cl.
CPC .......... *H04W 92/02* (2013.01); *G06F 9/4881* (2013.01); *G06F 9/5033* (2013.01); *H04W 4/02* (2013.01);
(Continued)

(58) Field of Classification Search
None
See application file for complete search history.

(56) References Cited

U.S. PATENT DOCUMENTS 10,039,057 B1 * 7/2018 Lam ..................... H04W 4/023
10,148,499 B2 * 12/2018 Furuhjelm ............ H04L 41/084
(Continued)

FOREIGN PATENT DOCUMENTS

CN 104869151 A 8/2015
CN 108600299 A 9/2018
(Continued)

OTHER PUBLICATIONS

International Search Report of PCT/CN2018/124471 (Sep. 26, 2019).
(Continued)

*Primary Examiner* — Bob A Phunkulh
(74) *Attorney, Agent, or Firm* — FIDELI LAW PLLC

(57) ABSTRACT

The present disclosure provides a distributed computing network system and a method. The distributed computing network may include: a plurality of nodes, where the plurality of nodes is connected through an n-layer network connection. When the distributed computing network receives a data processing task, a node in an $i^{th}$ layer is configured to: receive a data processing task that is corresponding to the $i^{th}$ layer and that is transmitted from a node in a lower layer; complete a data processing task $T_i$; transmit, to the node in the lower layer, a data processing result; and transmit, to a node in an upper layer, a remaining data processing task, a process of the data processing task meets a preset condition. The overall feedback time of the data processing task is reduced by distributing calculation tasks among multiple layers of nodes. The technology may be applied in both 4G and 5G network.

18 Claims, 6 Drawing Sheets

(51) Int. Cl.
  *G06F 9/50* (2006.01)
  *H04W 4/02* (2018.01)
  *H04W 80/08* (2009.01)
  *H04W 84/18* (2009.01)
  *H04L 67/10* (2022.01)
  *H04W 40/24* (2009.01)

(52) U.S. Cl.
  CPC ........... *H04W 80/08* (2013.01); *H04W 84/18* (2013.01); *H04L 67/10* (2013.01); *H04W 40/24* (2013.01)

(56) References Cited

U.S. PATENT DOCUMENTS

| | | | | |
|---|---|---|---|---|
| 10,999,163 | B2* | 5/2021 | Abraham | H04L 41/0843 |
| 2012/0265879 | A1* | 10/2012 | Casebolt | G06F 9/468 |
| | | | | 709/225 |
| 2013/0018935 | A1* | 1/2013 | Archer | G06F 9/5066 |
| | | | | 709/201 |
| 2013/0018947 | A1* | 1/2013 | Archer | G06F 15/781 |
| | | | | 709/204 |
| 2014/0108817 | A1* | 4/2014 | Chen | G06F 21/64 |
| | | | | 713/189 |
| 2015/0010146 | A1* | 1/2015 | Matsuda | H04L 9/0816 |
| | | | | 380/44 |
| 2015/0039904 | A1* | 2/2015 | Matsuda | H04L 9/0618 |
| | | | | 713/189 |
| 2015/0100676 | A1* | 4/2015 | Murata | G06F 9/5066 |
| | | | | 709/223 |
| 2015/0193270 | A1* | 7/2015 | Archer | G06F 9/5066 |
| | | | | 718/102 |
| 2015/0193271 | A1* | 7/2015 | Archer | G06F 9/4843 |
| | | | | 718/101 |
| 2017/0048159 | A1* | 2/2017 | Mäenpää | H04L 61/4511 |
| 2017/0134961 | A1* | 5/2017 | Ghosh | H04W 16/14 |
| 2017/0142008 | A1* | 5/2017 | Yoo | H04L 45/48 |
| 2018/0343567 | A1 | 11/2018 | Ashrafi | |
| 2019/0042163 | A1* | 2/2019 | Guim Bernat | G06F 3/0683 |
| 2019/0124143 | A1* | 4/2019 | Lee | H04L 67/104 |
| 2019/0289038 | A1* | 9/2019 | Li | H04L 9/3215 |
| 2021/0216245 | A1* | 7/2021 | Hao | G06F 3/067 |
| 2023/0267628 | A1* | 8/2023 | Nousias | G01B 11/2513 |
| | | | | 382/154 |
| 2023/0359520 | A1* | 11/2023 | Edamadaka | G06F 11/0793 |
| 2023/0362251 | A1* | 11/2023 | Tang | G16Y 30/00 |

FOREIGN PATENT DOCUMENTS

| | | |
|---|---|---|
| CN | 108694844 A | 10/2018 |
| CN | 108733051 A | 11/2018 |
| CN | 108809695 A | 11/2018 |
| CN | 108809723 A | 11/2018 |
| CN | 108901046 A | 11/2018 |
| CN | 109068391 A | 12/2018 |

OTHER PUBLICATIONS

Intel Corporation. "Local Breakout for Ultra-Low Latency Communications" 3GPP TSG-RAN WG3 #93 R3-161575, Aug. 26, 2016 (Aug. 26, 2016).

* cited by examiner

DISTRIBUTED COMPUTING NETWORK SYSTEM AND METHOD

RELATED APPLICATIONS

This application is a continuation application of PCT application No. PCT/CN2018/124471, filed on Dec. 27, 2018, and the content of which is incorporated herein by reference in its entirety.

TECHNICAL FIELD

The present disclosure relates to the field of network communications, and in particular to a distributed computing network system and a method.

BACKGROUND

The development of wireless communication technology imposes higher requirements for communication speed of mobile terminals. For example, in the field of autonomous driving, an autonomous vehicle may require timely data feedback in exchanging data with a cloud autonomous driving system. When the information cannot be fed back to the autonomous vehicle in time, the delay may result in driving safety hazards. In the existing technology, the to-be-processed data transmitted by the mobile terminal to a cloud server often passes through a series of data transfer devices (such as a base station). Such a long data transmission process may increase delay of data feedback.

Therefore, there is a need to provide a distributed computing network system and a method in which an operation module may be placed in the data transfer device so that the data transfer device may serve as a computing node in the distributed computing network, thereby reducing the delay that the mobile terminal receives data feedback.

SUMMARY

Based on the problem described above, the present disclosure provides a new technical solution to solve the technical problem of increased delay of data feedback resulted from a long data transmission time.

In some exemplary embodiments, the present disclosure provides a distributed computing network, including a plurality of nodes connecting through an n-layer network connection, where in the network connection a layer with larger layer number is a higher layer than a layer with a smaller layer number and a root node is the highest layer, when the distributed computing network receives a data processing task, a node in an $i^{th}$ layer is configured to: receive a data processing task corresponding to the $i^{th}$ layer and transmitted from a node in a lower layer of the $i^{th}$ layer; complete a data processing task $T_i$, where the data processing task $T_i$ is at least one part of the data processing task corresponding to the $i^{th}$ layer; transmit, to the node in the lower layer of the $i^{th}$ layer, a data processing result of the at least one part of the data processing task corresponding to the $i^{th}$ layer; and transmit, to a node in an upper layer of the $i^{th}$ layer, a remaining data processing task of the data processing task corresponding to the $i^{th}$ layer, such that a process of the data processing task meets a preset condition; where n is a positive integer greater than 1, and i is any integer from 1 to n.

In some exemplary embodiments, the node in the $i^{th}$ layer is further configured to: receive at least one part of a calculation result of the remaining data processing task transmitted from the node in the upper layer; and transmit, to the node in the lower layer, the at least one part of the calculation result of the remaining data processing task.

In some exemplary embodiments, the distributed computing network further includes the root node connecting to the plurality of nodes through the network connection, where the distributed computing network dynamically connects, through the network connection, to at least one mobile device as at least one mobile temporal node of the distributed computing network.

In some exemplary embodiments, the at least one mobile temporal node includes at least one mobile device located within a geographic range of the network connection of the plurality of nodes.

In some exemplary embodiments, the plurality of nodes and the at least one mobile temporal node includes a 5G wireless network communication device; and the network connection is wireless 5G connection.

In some exemplary embodiments, the at least one mobile device includes an autonomous vehicle transmitting the data processing task to the distributed computing network, the data processing task including an autonomous-driving-data processing task; and the plurality of nodes includes: at least one base station receiving the autonomous-driving-data processing task from the autonomous vehicle, and at least one equipment room, located at an upper layer of the at least one base station and receiving the data processing task transmitted from the at least one base station.

In some exemplary embodiments, the data processing task $T_i$ processed by the base station includes at least one of remote control and positioning of the autonomous vehicle.

In some exemplary embodiments, the root node includes a cloud server, and the cloud server is responsible for processing data statistics in the data processing task.

In some exemplary embodiments, the data processing task corresponds to a preset processing response time limit; the preset condition includes that a processing time of the data processing task in the distributed computing network is within the processing response time limit.

In some exemplary embodiments, the preset condition includes that time for the node in the $i^{th}$ layer to complete the data processing task $T_i$ is not greater than a sum of upper layer transmission time and upper layer processing time, the upper layer transmission time includes a hardware delay for transmitting the data processing task $T_i$ and corresponding processing result of the data processing task $T_i$ between the node in the $i^{th}$ layer and a node in at least one layer above the node in the $i^{th}$ layer, and the upper layer processing time includes time for the node in the at least one layer above the node in the $i^{th}$ layer to process the data processing task $T_i$.

In some exemplary embodiments, the present disclosure provides a data processing method, including: receiving, by a node in an $i^{th}$ layer of a distributed computing network, a data processing task corresponding to the $i^{th}$ layer and transmitted from a node in a lower layer, where the distributed computing network including a plurality of nodes connected through an n-layer network connection, in the network connection a layer with larger layer number is a higher layer than a layer with a smaller layer number and a root node is the highest layer; completing, by the node in the $i^{th}$ layer, a data processing task $T_i$, where the data processing task $T_i$ is at least one part of the data processing task corresponding to the $i^{th}$ layer; transmitting, by the node in the $i^{th}$ layer, to the node in the lower layer of the $i^{th}$ layer, a data processing result of the at least one part of the data processing task corresponding to the $i^{th}$ layer; and transmitting, by the node in the $i^{th}$ layer, to a node in an upper layer of the $i^{th}$ layer, a remaining data processing task of the data processing task corresponding to the $i^{th}$ layer, such that a process of the data processing task meets a preset condition; where n is a positive integer greater than 1, and i is any integer from 1 to n.

In some exemplary embodiments, the present disclosure provides a non-transitory computer readable medium, including at least one set of instructions, where when a processor of at least one computing device executes the at least one set of instructions, the at least one set of instructions enables the computing device to perform a data processing method.

By distributing computing tasks in the multi-level distributed computing network, the data processing burden of the nodes at the upper layer may be reduced, the overall feedback speed of the data processing tasks may be improved, and the requirements for quick feedback of some tasks with short response time may be satisfied.

BRIEF DESCRIPTION OF THE DRAWINGS

Exemplary embodiments of the present disclosure will be described in detail in the following accompanying drawings. The same drawing marks represent similar structures in several views of the drawing. Those generally skilled in the art will understand that these embodiments are non-restrictive and exemplary, and that the drawings are for illustrative and descriptive purposes only and are not intended to limit the scope of the present disclosure. Other embodiments may also achieve the objects of the present application.

DETAILED DESCRIPTION

Figure 1:
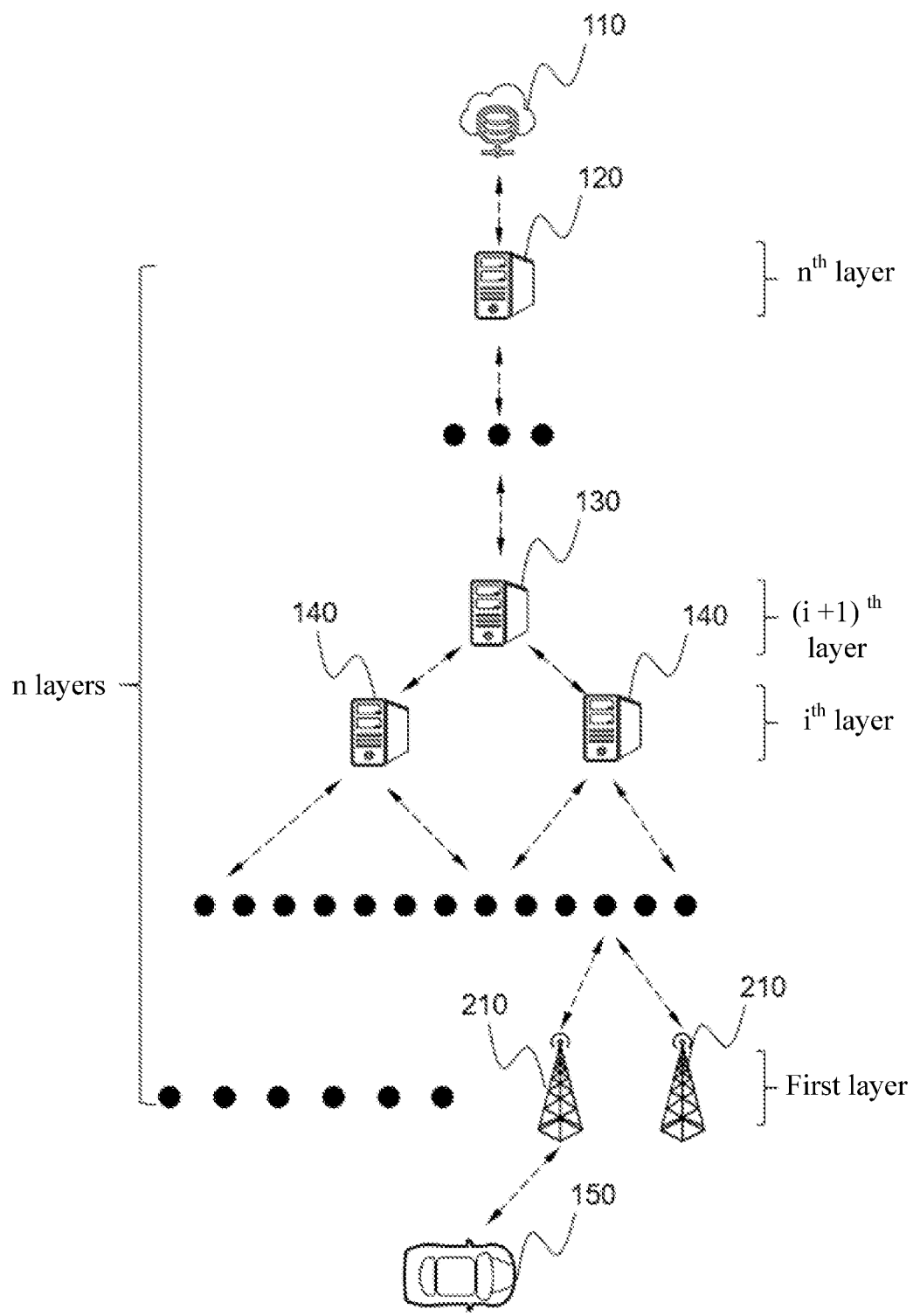
FIG. 1 is a schematic structural diagram of a distributed computing network according to some exemplary embodiments of the present disclosure.

The present disclosure discloses a system and a method of a distributed computing network system that allows dynamic access of mobile nodes. The distributed computing network system includes multi-level nodes with computing or data processing capabilities, and data exchange may be carried out between the multi-level nodes. Mobile devices such as an autonomous vehicle, a cell phone and the like may dynamically access the distributed computing network and upload a data processing task. Each level of computing nodes in the multi-level computing nodes may share a part of the data processing task, thereby increasing the speed at which the processing results of the data processing tasks are fed back to the mobile device. In the present disclosure, a structure and an operation of the distributed computing network may be described by using autonomous driving as an example. This does not constitute a limitation of the application area of the present disclosure. A person of ordinary skill in the art should recognize that any movable device with wireless communication may access to the distributed computing network and use the distributed computing network to complete the data processing task. For example, a cell phone user may access to the distributed computing network and upload the data processing task on the cell phone such as image processing, or gaming operation.

To provide a thorough understanding of the relevant disclosure to those of ordinary skill in the art, specific details of the present disclosure are described in the following example. However, the present disclosure should be understood to be consistent with the scope of protection of the claims and not limited to the specific details of the present disclosure. For example, various modifications to the embodiments disclosed in the present disclosure would be apparent to those of ordinary skill in the art; and without departing from the spirit and scope of the present disclosure, those of ordinary skill in the art could apply the general principles defined herein to other embodiments and applications. For another example, if derails are not disclosed in the following, those of ordinary skill in the art may practice the present disclosure without knowing such details. On the other hand, to avoid unnecessarily obscuring the content of the present disclosure, the present disclosure provides generalization of publicly known method, process, system, component and/or circuit without detailed description. Therefore, the disclosure of the present disclosure is not limited to the embodiments, but should be consistent with the scope of the claims.

The terms used in the present disclosure are for the purpose of describing specific example embodiments only and are not limiting. For example, unless clearly indicates in the context otherwise, a singular description of a component (for example, "a", "one" and/or equivalent description) in the present disclosure may also refer to a plurality of components. The terms "include" and/or "comprise" used in the present disclosure are open-ended. For example, the fact that A includes/comprises B only means that B exists in A, but does not preclude the possibility that other components (such as C) exist or are added in A.

It should be understood that the terms used in the present disclosure, such as "system", "unit", "module" and/or "block", is a method used to distinguish different components, elements, parts, sections or assemblies at different levels. However, if other terms can serve the same purpose, other terms may also be used in the present disclosure to replace the terms described above.

The module (or unit, block, cell) described in the present disclosure may be implemented as software and/or hardware module. Unless clearly indicates in the context otherwise, when a unit or module is described as "wired to", "connected to", or "coupled to" another unit or module, the expression may mean that the unit or module is directly connected, linked or coupled to the other unit or module, or indirectly connected, linked or coupled to the other unit or module. In the present disclosure, the term "and/or" includes any and all combinations of one or more of the relevant listed items.

In the present disclosure, the term "autonomous vehicle" may refer to a vehicle that is capable of sensing its environment and automatically sensing, determining, and thus making decisions about the external environment without human (for example, a driver, a pilot and the like) input and/or intervention. The terms "autonomous vehicle" and "vehicle" are used interchangeably. The term "automated driving" may refer to the capability to make intelligent determinations about the surrounding environment and navigate without human (for example, a driver, a pilot, and the like) input.

Considering the following description, these and other features of the present application, as well as the operation and function of the relevant elements of the structure, and the economy of the combination and manufacture of the components may be significantly improved. Referring to the attached drawings, all of those form part of the present disclosure. However, it should be clearly understood that the accompanying drawings are for illustrative and descriptive purposes only and are not intended to limit the scope of the present application. It should be understood that the accompanying drawings are not drawn to scale.

The flowchart used in the present disclosure illustrates the operations implemented by the system according to some exemplary embodiments in the present disclosure. It should be clearly understood that the operations of the flowchart may be implemented out of order. Instead, operations may be implemented in reverse or simultaneously. In addition, one or more other operations may be added to the flowchart. One or more operations may be removed from the flowchart.

The positioning technology used in the present disclosure may be based on Global Positioning System (GPS), Global Navigation Satellite System (GLONASS), Compass Navigation System (COMPASS), Galileo Positioning System, Quasi Zenith Satellite System (QZSS), Wireless Fidelity (WiFi) positioning technology and the like, or any combination thereof. One or more of the above positioning systems may be used interchangeably in the present disclosure.

Furthermore, although the system and method in the present disclosure primarily describe the distributed computing network system and the method with respect to the field of automated driving, it should be understood that they are only exemplary embodiments. The system or method of the present disclosure may be applied to any other field. For example, the system or method of the present disclosure may be applied to network systems in different environments, including cell phone networks, personal computer networks and the like, or any combination thereof.

FIG. 1 is a schematic structural diagram of a distributed computing network according to some exemplary embodiments of the present application. As shown in FIG. 1, the distributed computing network may include a plurality of nodes, such as a node 120, a node 130, a node 140, and a node 210 (the dots in the figure indicate the nodes omitted in that level). The plurality of nodes may be distributed in n levels and data may be exchanged between two adjacent levels of nodes. For example, the node 140 at the $i^{th}$ layer may exchange data with the node 130 at the $(i+1)^{th}$ layer. The node in the $i^{th}$ layer may be the node in any of then layers. In some exemplary embodiments, the node may exchange data with a node in the upper layer, and may exchange data with a plurality of nodes at the lower layer. For example, the node 140 may exchange data with the node 130 at the upper layer. The node 130 may exchange data with two nodes 140 at the lower layer. Accordingly, in the network connection a layer with larger layer number is a higher layer than a layer with a smaller layer number, and a root node of the network connection is in the highest layer.

The plurality of nodes may have data processing capability. The plurality of nodes may be equipped with a data processing device, including a central processing unit (CPU), a graphics processing unit (GPU), a micro control unit (MCU), or the like, or a combination thereof.

Some of the plurality of nodes may not have data processing capability. The node without data processing capability may work as a relay point to transmit data, through receiving/transmitting the data processing tasks, which may enable other nodes in the distributed computing network to complete the data processing task. For example, the node 130 may be a node without data processing capability, which may receive a data processing task from the node 140 and transmit the data processing task to a node in an upper layer, and the data processing task may be completed by other nodes with data processing capability in the upper layer.

The distributed computing network may also include a root node 110. The root node may be a node in the upper layer of the $n^{th}$ layer, and node in may be connected to a plurality of nodes at the $n^{th}$ layer through the network connection. For example, the root node 110 may be connected to a plurality of nodes 120 at the $n^{th}$ layer (one node 120 in the figure is used as an example). In some exemplary embodiments, the root node 110 may be a cloud server. The cloud server may have strong computing capability, and may store data statistics, such that it may have strong data processing capability. The root node 110 may also be other devices that may perform server functions, such as a commercial network platform and its servers, or another distributed computing network, or some mobile terminals with strong data processing capability. such as an airplane, a train, a cell phone, a laptop and so on.

In some exemplary embodiments, the distributed computing network may further include at least one mobile temporal node 150. The at least one mobile temporal node 150 may dynamically connect to the node 210 at the first layer. The at least one mobile temporal node 150 may include any mobile device with wireless communication capability, such as a computing device in an autonomous vehicle, a cell phone, a smartwatch, a laptop, an airplane and/or a train. The dynamic connection may include that the at least one mobile temporal node 150 may dynamically connect/disconnect a communication link to the node 210 in the first layer. For example, when moving into the wireless connection range of the distributed computing network, the at least one mobile temporal node may access to the distributed computing network at any time to become a temporal node. When the at least one mobile temporal node moves out of the connection range or a spare computing capability is insufficient, the temporal node will be automatically disconnected from the network. The dynamic connection may also include that the mobile node 150 dynamically switches its communication link with different nodes 210. For example, the autonomous vehicle may cut off its communication link with the first node 210 at some point and establish a communication link with the second node 210 instead.

In some exemplary embodiments the at least one mobile temporal node 150 may also establish a connection with a node in any other layer. When the at least one mobile temporal node 150 connects to the node in the $i^{th}$ layer shown in FIG. 1, the network structure between the node in the $i^{th}$ layer and the node in its upper layer may be regarded as an n−(i−1) layer network structure identical to the network structure in FIG. 1. For example, when the at least one mobile temporal node 150 connects to the node 140, the node 140 and the node in its upper layer also constitute the distributed computing network structure described in FIG. 1.

The at least one mobile temporal node 150 may include at least one mobile device located within a geographical range of the network connection of the plurality of nodes. The geographical range of the network connection of the node may include a geographical range to which the at least one mobile device may be connected to the node. For example, when the node 210 is a base station, the geographical range of the network connection of the node may be a signal coverage of the base station. When the at least one mobile device is within the signal coverage area, the at least one mobile device may be used as the at least one mobile temporal node 150 to connect to the node 210. For all the nodes in the distributed computing network that may establish a wireless network connection with the at least one mobile device, the union of their respective signal coverage areas may be used as the geographical range of the network connection of the plurality of nodes. The at least one mobile device within the range may establish a wireless network connection with at least one node in the distributed computing network. For example, if the nodes 210 at the first layer includes all communication base stations within Beijing, the geographical range of Beijing is the geographical range of the network connection of the plurality of nodes.

Figure 4:
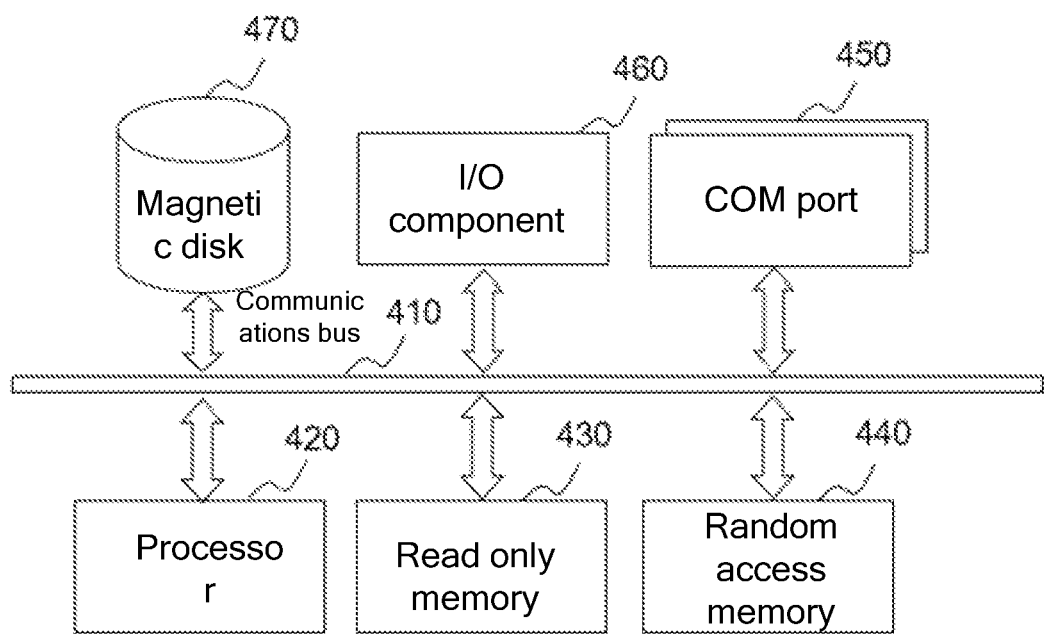
FIG. 4 is a schematic diagram of an exemplary hardware component and a software component of an information processing unit according to some exemplary embodiments of the present disclosure.

The at least one mobile temporal node 150 may transmit a data processing task to the node 210 in the first layer in which the connection is established. In some exemplary embodiments, the data processing task may include a plurality of subtasks. For example, when the at least one mobile temporal node 150 is an autonomous vehicle, the data processing task may be an autonomous-driving-data processing task (or an automated driving task). The autonomous-driving-data processing task may include an image processing subtask, a positioning subtask, a remote-control subtask, a data statistics subtask, a driving strategy decision subtask, an information sharing task, or similar task or a combination thereof. The data processing task may be jointly completed by some nodes in the distributed computing network. The detailed data processing method is shown in FIG. 4 and related description thereof.

In some exemplary embodiments, the distributed computing network may be constructed on based on the existing wireless communication network. For example, in the existing cell phone communication network system, after receiving the data processing task transmitted by the cell phone, the base station may transmit it to the network nodes at the upper level or upper multi-levels (such as an operator's equipment room), and may send it to the cloud server to perform it. In this process, the base station or the operator's equipment room only transmits data but does not process data. By adding data processing device (for example, adding a computer device on the base station) to the network nodes such as the base station and the operator equipment room, may enable these network nodes to have data processing capability, such that they may be used as nodes in the distributed computing network. Using FIG. 1 as an example, the node 210 at the first layer may be a base station (hereinafter may also be referred to as a base station 210), and the node 120, the node 130, or the node 140 may be the equipment room or other similar data transfer node.

Those of ordinary skill in the art should realize that the construction of the distributed computing network based on the existing cell phone wireless communication network architecture in the present disclosure is only one embodiment of the present disclosure, it should not be regarded as a limitation on the application scenario of the system or method described in the present disclosure. For example, the node 210 at the first layer may be an access point of a WIFI network. For another example, the node 210 at the first layer may also be a mobile network access point, such as a satellite in a space-based 5G network.

In some exemplary embodiments, the at least one mobile temporal node 150 and the plurality of nodes may be 5G wireless network communication devices, and the network connection between the nodes may be 5G network connection.

Figure 2:
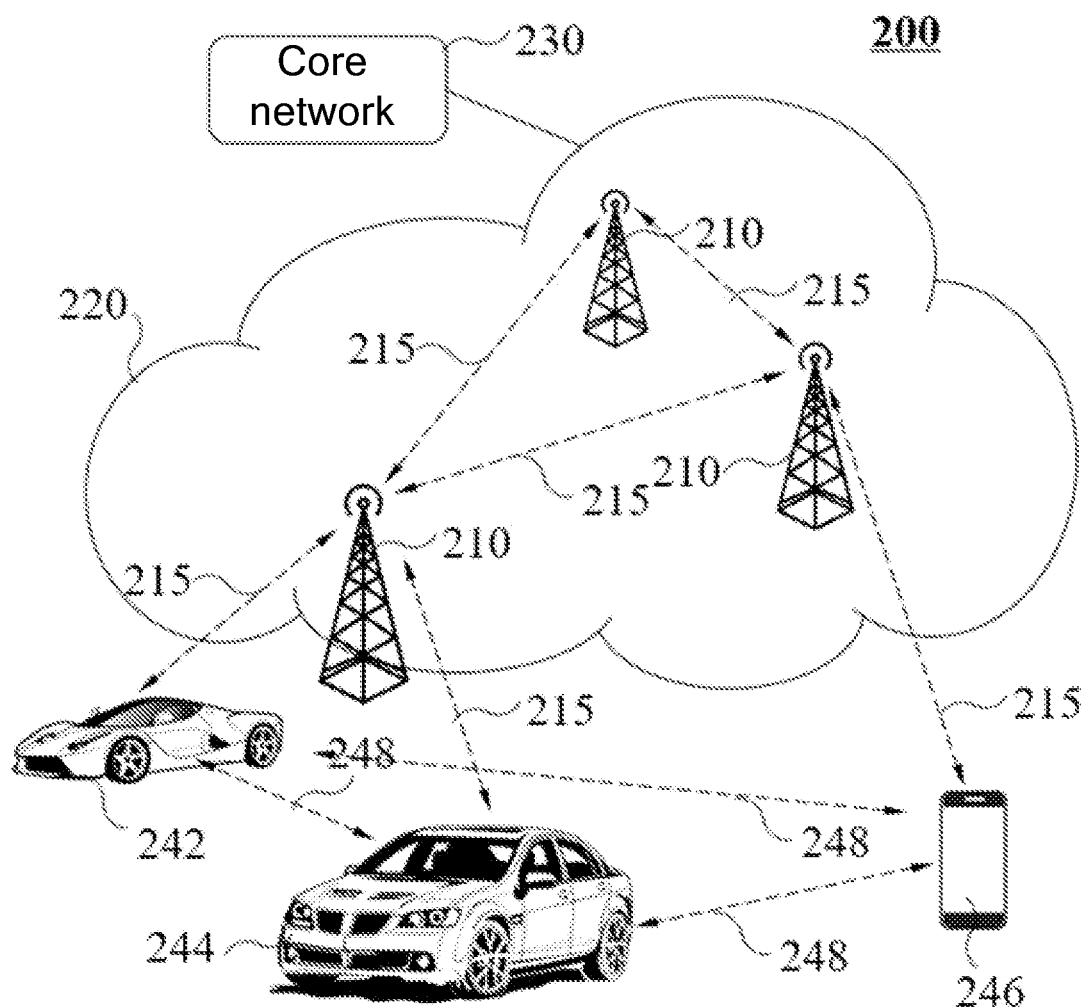
FIG. 2 is a schematic diagram of a wireless communication system for managing a mobile device network according to some exemplary embodiments of the present disclosure.

FIG. 2 is a schematic diagram of some exemplary embodiments of a wireless communication system 200 for managing a mobile device network. The mobile device network management system may be used as a supporting network application in the present disclosure.

A wireless communication system 200 may include remote units 242, 244, and 246, base stations 210, and wireless communication links 215 and 248. A non-limiting exemplary quantity of the remote units 242, 244, and 246, the base stations 210 and the wireless communication links 215 and 248 are described in FIG. 2. However, those of ordinary skill in the art will recognize that any quantity of the remote units 242, 244, and 246, the base stations 210 and the wireless communication links 215, and 248 may be included in the wireless communication system 200.

In some exemplary embodiments, the remote units 242, 244, and 246 may be mobile devices, such as on-board computers (including on-board computers of human-driven vehicles and/or autonomous vehicles capable of autonomous driving) 242, and 244, and other mobile device 246 such as a cell phone, a laptop, a personal digital assistant (PDA), a tablet computer, a smartwatch, a fitness band, an optical head mounted display or the like. The remote units 242, 244, and 246 may also include non-mobile computing devices, such as desktop computers, smart TVs (for example, TVs connected to the Internet), set top box, game consoles, security systems (including security cameras), fixed network device (for example, routers, switches, modems), and the like. In addition, the mobile remote units 242, 244, and 246 may be referred to as mobile stations, mobile devices, users, terminals, mobile terminals, fixed terminals, subscriber stations, UE, user terminals, devices, or other terms used in the art.

The remote units 242, 244, and 246 may be connected via wireless link 248. The wireless link among the remote units 242, 244, and 246 may be 5G communication and other wireless communication, such as Bluetooth, WiFi, and so on. The base stations 210 form a radio access network (RAN) 220. The base stations 210 may be connected via wireless link 215. The RAN 220 may be coupled to a mobile core network 230 via communication. The mobile core network 230 may be a 5G network, or a 4G, a 3G, a 2G network or in other forms of network. In some exemplary embodiments, the network may be a 5G network. When the remote units communicate with the base stations 210, any communication environment from 2G to 4G may be used. However, since the communication requires short network delay and high data transmission speed, the 5G network environment is more suitable for communication between the vehicles. The data transmission rate of 4G is on an order of magnitude of 100 Mbps, the delay is 30-50 ms, and the maximum number of connections per square kilometer is on an order of 10,000, and the mobility is about 350 km/h, while the transmission rate of 5G is 10 Gbps, the delay is 1 ms, and the maximum number of connections per square kilometer is on an order of magnitude of millions, and the mobility is about 500 km/h. 5G has a higher transmission rate, shorter delay, more connections in a square kilometer, and higher speed tolerance. One more change in 5G is the change in transmission path. In the past, when we make a call or send a photo, all signals are transferred through the base station. However, since 5G, signals may be directly transmitted between devices without passing through the base station. Therefore, although the exemplary embodiment of the present disclosure is also suitable for 4G environment, it will get better technical performance and reflect higher commercial value when running in the 5G environment.

The 5G mobile core network 230 may be a single public land mobile network (PLMN). For example, the mobile core network 230 may provide low-delay and high-reliability services, such as being applied in the field of automated driving. The mobile core network 230 may also provide services for other application requirements. For example, the mobile core network 230 may provide high data transmission rate and medium delay traffic service, for example, providing a service to a mobile device such as a cell phone. For example, the mobile core network 230 may also provide low-mobility and low data transmission rate service.

The base stations 210 may serve the plurality of remote units 242, 244, and 246 in a service area, for example, a cell or a cell sector, through wireless communication links. The base stations 210 may directly communicate with one or more remote units 242, 244, and 246 through communication signals. The remote units 242, 244, and 246 may directly communicate with one or more base stations 210 through uplink (UL) communication signals. In addition, the UL communication signals may be carried by wireless communication links 215, and 248. The base stations 210 may also transmit downlink (DL) communication signals to serve remote units 242, 244, and 246 in the time domain, frequency domain, and/or space domain. In addition, the DL communication signals may be carried through the wireless communication links 215. The wireless communication links 215 may be any suitable carrier in licensed or unlicensed radio spectrum. The wireless communication links 215 may communicate with one or more remote units 242, 244, and 246 and/or one or more base stations 210. In some exemplary embodiments, the wireless communication system 200 may comply with the long-term evolution (LTE) of the 3GPP protocol, where the base stations 210 use orthogonal frequency division multiplexing (OFDM) modulation scheme to transmit on the DL. The remote units 242, 244, and 246 may use single-carrier frequency division multiple access (SC-FDMA) scheme to transmit of the UL. However, generally, the wireless communication system 220 may implement some other open or specific communication protocols, such as WiMAX, and other protocols. The present disclosure does not limited the implementation of any specific wireless communication system architecture or protocol.

The base stations 210 and the remote units 242, 244, and 246 may be distributed in the geographical area. In some exemplary embodiments, the base stations 210 and the remote units 242, 244, and 246 may also be referred to as access point, access terminal, or any other term used in the art. Typically, two or more geographically adjacent base stations 210 or remote units 242, 244, and 246 are combined into routing areas. In some exemplary embodiments, the routing area may also be referred to as a location area, a paging area, a tracking area, or any other term used in the art. Each "routing area" may have an identifier transmitted from the service base stations 210 to the remote units 242, 244, and 246 (or transmitted among the remote units 242, 244, and 246).

When the mobile remote units 242, 244, and 246 move to a new cell broadcasting different "routing areas" (for example, moves within the range of new base stations 210), the mobile remote units 242, 244, and 246 may detect changes in the routing area. The RAN 220 may then page the mobile remote units 242, 244, 246 in an idle mode through the base stations 210 in the current routing area. The RAN 220 may include a plurality of routing areas. As known in the art, the size of the routing area (for example, the number of base stations in the routing area) may be selected to balance update signaling load and paging signaling load in the routing area.

In some exemplary embodiments, the remote units 242, 244, and 246 may be attached to the core network 230. When the remote units 242, 244, and 246 detect a mobile device network management event (for example, a change of the routing area), the remote units 242, 244, 246 may transmit, to the core network 230 (for example, the low-delay and high-reliability service for automated driving, or the high data transmission rate and medium delay traffic service for the mobile phone), a request for mobile device network management. Thereafter, the core network 230 may forward the mobile device network management request to one or more auxiliary network slicings connected to the remote units 242, 244, and 246 to provide corresponding services.

At some point, the remote units 242, 244, and 246 may no longer need a specific network service (for example, the low-delay and high-reliability service for automated driving, or the high data transmission rate and medium delay traffic service for the mobile phone). In this case, the remote units 242, 244, and 246 may transmit separation request messages, such as data connection release message, to separate from the network.

Figure 3:
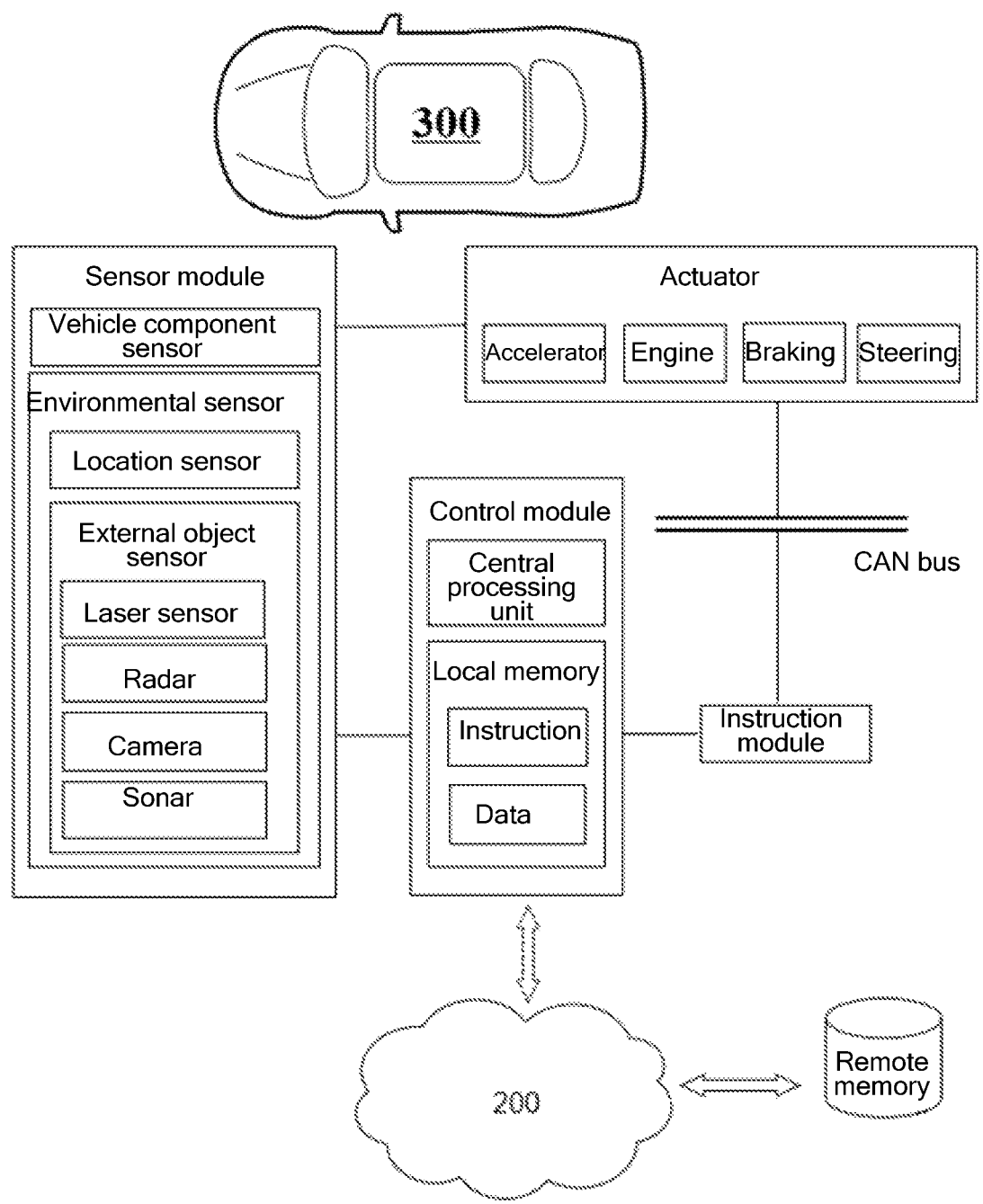
FIG. 3 is a block diagram of an autonomous vehicle according to some exemplary embodiments of the present disclosure.

FIG. 3 is a block diagram of an exemplary autonomous vehicle according to some exemplary embodiments of the present disclosure. A vehicle 300 may be the vehicles 242 and 244 in the wireless communication system 200 managed by the mobile device network shown in FIG. 2. For example, the vehicle 300 with autonomous driving capability may include a control module, a plurality of sensors, a memory, an instruction module, a controller area network (CAN), and an actuator.

The actuator may include, but is not limited to, driving executions of an accelerator, an engine, a braking system, and a steering system (including steering of tires and/or operation of turn signals).

The plurality of sensors may include various internal and external sensors that provide data to the vehicle 300. For example, as shown in FIG. 3, the plurality of sensors may include a vehicle component sensor and an environmental sensor. The vehicle component sensor may be connected to the actuator of the vehicle 300, and may detect an operating status and parameters of each component of the actuator.

The environmental sensor may allow the vehicle to understand and potentially respond to the environment, so as to help the autonomous vehicle 300 perform navigation, route planning, and ensure safety of passengers and safety of people or property in the surrounding environment. The environmental sensor may also be used to identify, track and predict movements of objects, such as pedestrians and other vehicles. The environmental sensor may include a location sensor and an external object sensor.

The location sensor may include a GPS receiver, an accelerometer and/or a gyroscope, and a receiver. The location sensor may sense and/or determine geographic locations and orientations of the autonomous vehicle 300. For example, the location sensor may determine latitude, longitude and altitude of the vehicle.

The external object sensor may detect objects outside the vehicle, such as other vehicles, obstacles, traffic signals, signs, trees and the like in the road. The external object sensor may include at least one of: a laser sensor, a radar, a camera, a sonar, or other detection devices.

The laser sensor may measure a distance between the vehicle and a surface of an object facing the vehicle by rotating on its axis and changing its spacing. The laser sensor may also be used to identify changes in surface texture or reflectivity. Therefore, the laser sensor may be configured to detect the lane line by distinguishing the amount of light reflected by the painted lane line relative to the unpainted dark road surface.

The radar sensor may be located on the front and rear of the car and on either side of the front bumper. In addition to using the radar to determine a relative position of the external objects, other types of radar, such as traditional speed detectors, may also be used for other purposes. A shortwave radar may be used to determine depth of snow on the road and determine location and condition of the road.

The camera may capture a visual image around the vehicle 300 and extract content from it. For example, the camera may take pictures of road signs on both sides of the road and identify the meaning of these signs through the control module. For example, the camera may be used to determine speed limit of the road. The vehicle 300 may also calculate the distance of surrounding objects from the vehicle 300 through a parallax of different images taken by the camera.

The sonar may detect the distance between the vehicle 300 and surrounding obstacles. For example, the sonar may be an ultrasonic rangefinder. The ultrasonic rangefinder is installed on a left side, a right side, and a rear side of the vehicle, and may be turned on during parking to detect the obstacle around the parking space and the distance between the vehicle 300 and the obstacle.

After receiving the information sensed by the plurality of sensors, the control module may process the information and/or data related to vehicle driving (for example, autonomous driving) to perform one or more functions described in the present disclosure. In some exemplary embodiments, the control module may be configured to autonomously drive the vehicle. For example, the control module may output a plurality of control signals. The plurality of control signals may be configured to be received by one or more electronic control units (ECU) to control the driving of the vehicle. In some exemplary embodiments, the control module may determine a reference route and one or more potential routes based on the environmental information of the vehicle.

In some exemplary embodiments, the control module may include one or more central processors (for example, a single-core processor or a multi-core processor). In some non-limiting examples, the control module may include a central processing unit (CPU), an application-specific integrated circuit (ASIC), an application-specific instruction-set processor (ASIP), and a graphics processing unit (GPU), a physical processing unit (PPU), a digital signal processor (DSP), a field programmable gate array (FPGA), a programmable logic device (PLD), a controller, a microcontroller unit, a reduced instruction-set computer (RISC), a microprocessor or the like, or any combination thereof.

The memory may store data and/or instructions. In some exemplary embodiments, the memory may store data obtained from the autonomous vehicle sensor. In some exemplary embodiments, the memory may store data and/or instructions that may be executed or used by the control module to perform the exemplary methods described in the present disclosure. In some exemplary embodiments, the memory may include a mass memory, a removable memory, a volatile read-and-write memory, a read-only memory (ROM) or the like, or any combination thereof. As an example, the mass memory may include a magnetic disk, an optical disk, a solid-state drive and the like; the removable memory may include a flash drive, a floppy disk, an optical disk, a memory card, a zipper disk, and a magnetic tape; the volatile read-write memory may include a random access memory (RAM); the RAM may include a dynamic RAM (DRAM), a double data rate synchronous dynamic RAM (DDR SDRAM), a static RAM (SRAM), a thyristor RAM (T-RAM) and a zero capacitor RAM (Z-RAM); and the ROM may include a mask ROM (MROM), a programmable ROM (PROM), an erasable programmable ROM (EPROM), an electrically erasable programmable ROM (EEPROM), a compact disk ROM (CD-ROM), a digital universal disk ROM, and the like. In some exemplary embodiments, storage may be implemented on a cloud platform. For example, the cloud platform may include a private cloud, a public cloud, a hybrid cloud, a community cloud, a distributed cloud, an inter cloud, multi clouds, or the like, or any combination thereof.

In some exemplary embodiments, the memory may be a local memory, that is, the memory may be a part of the autonomous vehicle 300. In some exemplary embodiments, the memory may also be a remote memory. The central processing unit may be connected to the remote memory through the network 200 to communicate with one or more components (for example, the control module, a sensor module) of the autonomous vehicle 300. One or more components in the autonomous vehicle 300 may access data or instructions remotely stored in the remote memory through the network 200. In some exemplary embodiments, the memory may be directly connected to or communicate with one or more components (for example, the control module or the sensor) in the autonomous vehicle 300.

The instruction module may receive information transmitted by the control module, convert it into an instruction to drive the actuator, and transmit it to a controller area network (CAN) bus. For example, the control module may transmit a driving strategy (for example, acceleration, deceleration, turning and the like) of the autonomous vehicle 200 to the instruction module, and the instruction module may receive the driving strategy and convert it into a driving instruction for the actuator (for example, a driving instruction for the accelerator, a brake mechanism, or a steering mechanism). At the same time, the instruction module may dispense the instruction to the actuator through the CAN bus. The execution of the instructions by the actuator may be detected by the vehicle component sensor and may be fed back to the control module, thereby completing closed-loop control and driving of autonomous vehicle 300.

With reference to FIG. 1 to FIG. 3, FIG. 4 is a schematic diagram of exemplary hardware component and software component of an information processing unit 400. The information processing unit 400 may carry a method for processing the data processing task by the node and for performing data transmission. For example, the node shown in FIG. 1 may include at least one information processing unit 400, where the information processing unit 400 may perform part or all of the data processing task, as well as exchange data with an information processing unit 400 of a node in an upper layer or a node in a lower layer.

The information processing unit 400 may be a special-purpose computer device designed for constructing the distributed computing network.

For example, the information processing unit 400 may include a network COM port 450 connected thereto for data communication. The information processing unit 400 may further include a processor 420, where the processor 420 may be configured to execute, in the form of one or more processors, a computer instruction. The computer instruction may include, for example, a routine, a program, an object, a component, a data structure, a procedure, a module, or a function that performs specific functions described herein. The processor 420 may process all or part of the received data processing task, send the remaining data processing task to the node in the upper layer through an I/O component 460, and send the result of some or all of the locally processed data processing task to the node in the lower layer.

In some exemplary embodiments, the processor 420 may include one or more hardware processors, such as a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, or any combination thereof.

The information processing unit 400 may include an internal communications bus 410, a program memory, and different forms of data storage devices (for example, a magnetic disk 470, a read only memory (ROM) 430, or a random-access memory (RAM) 440) for various data files processed and/or sent by the computer. A global map may be stored in the storage device. The information processing unit 400 may also include program instructions stored in the ROM 430, the RAM 440 and/or other types of non-transitory storage media to be executed by the processor 420. The method and/or process of the present application may be implemented as the program instruction. The information processing unit 400 may also include the I/O component 460, which supports input/output between a computer and other components (for example, a user interface component). The information processing unit 400 may also receive programming and data through network communication.

In some exemplary embodiments, only one processor is described in the information processing unit 400 in the present disclosure. However, it should be noted that the information processing unit 400 in the present disclosure may also include a plurality of processors. Therefore, the operations and/or method steps disclosed in the present disclosure may be executed by one processor described in the present disclosure, or may be jointly executed by a plurality of processors. For example, if the processor 420 of the information processing unit 400 performs step A and step B in the present disclosure, it should be understood that step A and step B may also be performed jointly or separately by two different processors in the information processing unit (for example, a first processor executes step A, and a second processor executes step B; or the first processor and the second processor jointly execute step A and step B).

Figure 5:
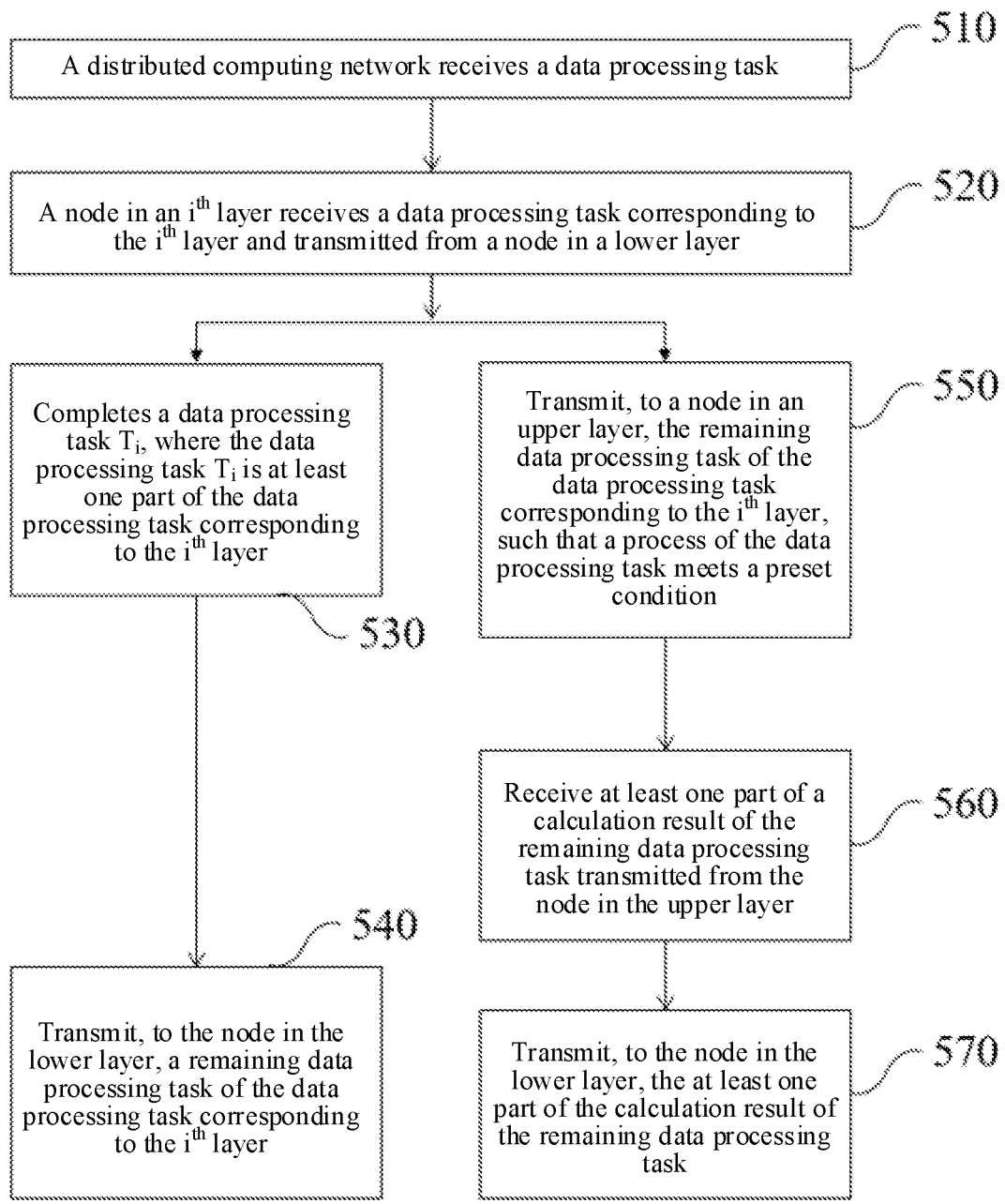
FIG. 5 is an exemplary flowchart of an operation state of a distributed computing network according to some exemplary embodiments of the present disclosure.

FIG. 5 is an exemplary flowchart of an exemplary embodiment of an operation state of a distributed computing network in the present disclosure. This process may include that after the distributed computing network receives a data processing task, according to a preset condition, each node may perform its corresponding data processing task, and may feed it back to a device that transmits the data processing task.

In step 510, the distributed computing network may receive the data processing task. In some exemplary embodiments, the data processing task transmitted by the at least one mobile temporal node 150 may be received by a specific node in the distributed computing network. For example, in the exemplary embodiment shown in FIG. 1, the base station 210 may receive the data processing task transmitted by the autonomous vehicle 150 (that is, the at least one mobile temporal node 150). When entering a signal coverage area of the base station 210, the autonomous vehicle 150 may establish a wireless network connection with the base station 210 and send the data processing task. The data processing task transmitted by the autonomous vehicle 150 may be an automatic driving data processing task. The autonomous-driving-data processing task may include a plurality of subtasks, such as an image processing subtask, a positioning subtask, a remote-control subtask, a data statistics subtask, a driving strategy decision subtask, or similar task or a combination thereof. The subtask may be completed by a single node, or it may be split and completed by a plurality of nodes in parallel computing.

For a data processing task, it may be transmitted from the node that receives the data processing task to a node in the upper layer in a hierarchical order, until to the cloud server 110 (that is, the root node 110). The node in each layer may transmit the data to the upper/lower layer, and may undertake or not undertake part of the data processing task. The operation status of one node participating in the data processing task in the distributed computing network is described in the following. It should be understood that the description of this node is also applicable to nodes at any level of the distributed computing network that participate in the data processing task.

In step 520, a node in an $i^{th}$ layer receives a data processing task corresponding to the $i^{th}$ layer transmitted from a node in a lower layer. The $i^{th}$ layer is any layer of the n layers. The data processing task corresponding to the $i^{th}$ layer may include the remaining subtasks transmitted from the node in the lower layer to the node in the $i^{th}$ layer after the corresponding subtasks are intercepted (and processed) by each layer of node below the node in the $i^{th}$ layer. For example, in the field of automated driving, a node in a third layer may receive a data processing task corresponding to the third layer and that is transmitted by a node in the second layer. A node in the first layer (the base station 210) may retain the remote-control subtask and the positioning subtask of the data processing task for processing and transmits the remaining task to the node in the second layer. The node in the second layer may retain the image processing subtask for processing, and transmits the remaining task to the node in the third layer. The data processing task corresponding to the third layer refers to other subtasks after removing the remote-control subtask, the positioning subtask and the image processing subtask in the automated driving task. In particular, when i=1, it corresponds to the node 210 at the first layer, and the node in the lower layer is the at least one mobile temporal node 150 with an established connection. At this time, the data processing tasks corresponding to the $i^{th}$ layer refers to all the data processing tasks acquired from the at least one mobile temporal node 150.

After receiving the data processing task corresponding to the $i^{th}$ layer, the node in the $i^{th}$ layer may process some subtasks, and continue to transmit the remaining task to the node in the upper layer. In some exemplary embodiments, the continuing transmission to the node in the upper layer may include transferring to the root node 110 layer by layer. In FIG. 5, the left branches (steps 530 and 540) may correspond to procedures in which the node in the $i^{th}$ layer processes some subtasks, and the right branches (steps 550, 560 and 570) may correspond to procedures in which the node in the $i^{th}$ layer continues to transmit the remaining part to the node in the upper layer. The node in the $i^{th}$ layer may synchronize the procedures corresponding to the two branches, that is, it may process data locally and exchange data with the node in the upper layer simultaneously.

In step 530, the node in the $i^{th}$ layer may complete a data processing task $T_i$. The data processing task $T_i$ may be at least one part of the data processing task corresponding to the $i^{th}$ layer. In step 550, the node in the $i^{th}$ layer may transmit, to the node in the upper layer, the remaining data processing task of the data processing task corresponding to the $i^{th}$ layer, such that a process of the data processing task meets a preset condition. That is, the division of the data processing task corresponding to the $i^{th}$ layer (the local data processing task $T_i$ and the task of uploading remaining data) should enable the process of the data processing task to meet the preset condition. The preset condition may include one or more sub-conditions. The meeting the preset condition may refer to meeting one or more sub-conditions of the plurality of sub-conditions. For example, the plurality of sub-conditions may include a first condition and a second condition. The meeting the preset condition may include meeting the first condition and the second condition simultaneously, or meeting one of the first condition and the second condition.

In some exemplary embodiment, the data processing task may correspond to a preset processing response time limit. The first condition may be that the processing time of the data processing task in the distributed computing network is within the processing response time limit. The preset processing response time limit may refer to the time limit of the distributed computing network from receiving the data processing task to completing the data processing task and then sending it to the at least one mobile temporal node 150. For example, in an obstacle avoidance scene of the autonomous vehicle, due to the urgency of the situation, the autonomous vehicle must avoid obstacle within a specific period of time (for example, 0.1 second) to avoid a traffic accident. Therefore, the autonomous vehicle 150 may send a driving strategy decision request to the distributed computing network, requiring the distributed computing network to feed back the driving strategy within 0.1 second, such that the preset processing response time limit is 0.1 second.

In some exemplary embodiments, the preset processing response time limit may be included in the data processing task, and transmitted to the distributed computing network along with the data processing task. In some exemplary embodiments, the preset processing response time limit may also be separately transmitted from the data processing task or preset in the distributed computing network. For example, a corresponding processing time limit may be set in advance in the distributed computing network according to different types of data processing tasks. For example, for the driving strategy decision-making task, a shorter processing response time limit may be set to ensure safety; for the data statistics task, a longer processing response time limit may be set.

The first condition may require that the total time spent by the distributed computing network processing the data processing task is within the processing response time limit. In other words, strategies may be divided corresponding to nodes at all levels, such that the total time for completing the data processing task is less than the response time limit. Since the data processing task has a network delay in the process of transmitting and downloading the processing results from the node in the upper layer, some data processing tasks with a short processing response time may be processed at a node in a lower level; and some processing data processing tasks with a long response time may be processed at a node in a higher level. For example, the positioning subtask and the remote-control subtask in the autonomous vehicle task may be processed by the base station 210; and the statistics subtask may be uploaded to the cloud server 110 for processing.

In some exemplary embodiments, the second condition may include that the time for the node in the $i^{th}$ layer to complete the data processing task $T_i$ is not greater than:

$$t_{i\_UL}+t_{i+1\_DL}+t_{i+1 \sim n+1}=t_{i\_trans}+t_{i+\_cal}$$

Where $t_{i+1 \sim n+1}$ indicates a total time of the node in the $(i+1)^{th}$ layer to the root node (that is, the node in the layer higher than the $n^{th}$ layer) to complete the data processing task $T_i$ if the data processing task $T_i$ is transmitted to the node in the upper layer; $t_{i\_UL}$ indicates the time used by the node in the $i^{th}$ layer to transmit the data processing task $T_i$ to the node in the $(i+1)^{th}$ layer, where this period of time includes the hardware delay of the device and the time required to transmit data, and UL stands for uplink; $t_{i+1\_DL}$ indicates the time used by the node in the $(i+1)^{th}$ layer to transmit the processing result of the data processing task $T_i$ to the node in the $i^{th}$ layer, where this period of time may include the hardware delay of the device and the time required to transmit data, and DL stands for downlink. $t_{i\_trans}$ is the upper layer transmission time, which indicates the hardware delay for transmitting the data processing task $T_i$ and its corresponding processing result between the node in the $i^{th}$ layer and at least one level node in its upper layer (including the root node); $t_{i+\_cal}$ is the upper layer processing time, which indicates the time for processing the output processing task $T_i$ by the at least one level node in its upper layer.

The second condition may indicate the condition that needs to be met where the node in the $i^{th}$ layer retains the data processing task $T_i$ at this node for processing without transmitting to the node in the upper layer. In other words, the time required for locally completing the data processing task $T_i$ is less than the time required for uploading the task to the node in the upper layer for processing. Due to network delay, one more data transmission will cause more network delay. Therefore, in some cases, even if the node in the upper layer has a stronger computing capability and calculate faster, due to impact of upload and download delay, the time for uploading the task for processing may be greater than the time required for locally completing the data processing task $T_i$ by the node. For example, for the base station 210, the received data processing task may include the positioning subtask. The time required for processing the positioning subtask by the base station 210 may be 0.3 milliseconds. In the case where the positioning subtask is uploaded to the node in the upper layer (including at least one node between the node in the upper layer and the root node 110) by the base station 210 for processing, the time spent by the node in the upper layer may be 0.2 milliseconds (including the time spent by the node processing data and the time spent on information exchange between a plurality of nodes at a layer higher than the upper layer). If the upload process and the download process each take 0.1 milliseconds, the scheme of uploading the task to the node in the upper layer for processing will take 0.4 milliseconds. In this case, it takes less time for processing the positioning subtask in the base station 210, thereby meeting the second condition.

In some exemplary embodiments, the sub-condition may further include data transmitted step by step and intercepted, where the data is processed according to a preset data lossless compression method. For example, the data transmitted at each layer and/or intercepted may be encoded in a Huffman coding manner to reduce data bytes.

In some exemplary embodiments, the sub-condition may further include that the remaining data processing task meets an upload bandwidth bottleneck. For example, for the data processing task $T_i$, when it is processed at the node in the $i^{th}$ layer, the time cost may be 0.2 seconds. Data volume corresponding to the data processing task $T_i$ may be 2 GB, and a network connection bandwidth between the node in the $i^{th}$ layer and the node in the upper layer may be 10 GB/s. In some exemplary embodiments, the time for transmitting the data processing task $T_i$ by the node in the $i^{th}$ layer to the node in the upper layer may reach 0.2 seconds, plus the processing time of the node in the upper layer and download time of the processing result. In comparison, the time for locally completing the data processing task $T_i$ may be shorter. At this point, the remaining data processing task does not meet the upload bandwidth bottleneck.

In some exemplary embodiments, the distributed computing network may predetermine a strategy for dividing the data processing task according to the preset condition. For example, the distributed computing network may determine the strategy according to types of subtasks in the data processing task. For example, the positioning subtask and the remote-control subtask in the automated driving task may be processed by the base station 210; and the data statistics subtask may be uploaded to the cloud server 110 for processing.

In some exemplary embodiments, the distributed computing network may also dynamically adjust, according to factors such as the computing capability of different nodes and the network connection bandwidth, the computing task of each node when receiving the data processing task. For example, when receiving the automated driving task, the base station 210 may retain a subtask suitable for processing locally according to its own computing capability. For example, for the automated driving task including the image processing subtask and the driving strategy decision subtask, when the base station 210 equipped with the GPU receives the automated driving task, it may retain the image processing subtask for local processing and upload the driving strategy decision subtask to the node in the upper layer for processing; and when the base station 210 equipped with the CPU receives the automated driving task, it may leave the driving strategy decision subtask for local processing, and upload the image processing subtask to the node in the upper layer for processing.

In some exemplary embodiments, the node in the $i^{th}$ layer (that is, a relay node) may have no computing capability, such that the data processing task $T_i$ corresponding to the node in the $i^{th}$ layer is null, and the data processing task corresponding to the $i^{th}$ layer received by the node in the $i^{th}$ layer may be uploaded to the node in the upper layer.

In step 540, the node in the $i^{th}$ layer may transmit at least a part of the data processing result (a first processing result) of the data processing task corresponding to the $i^{th}$ layer to the node in the lower layer. After completing the data processing task $T_i$ retained locally, the node in the $i^{th}$ layer transmits the first processing result to the lower layer along an opposite direction of an upload path of the data processing task. In particular, when i=1, the node 210 at the first layer may directly transmit the first processing result to the at least one mobile temporal node 150.

In step 560, the node in the $i^{th}$ layer may receive at least one part of a calculation result (a second processing result) of the remaining data processing task transmitted from the node in the upper layer. After the remaining data processing task is processed by the nodes at one or more layers higher than the $i^{th}$ layer, the second processing result may be transmitted to the node in the $i^{th}$ layer by the node in the upper layer.

In step 570, the node in the $i^{th}$ layer may transmit, to the computing node in the lower layer, the at least one part of the calculation result of the remaining data processing task. The second processing result may be transferred to the lower layer in the same manner as the first processing result.

In some exemplary embodiments, the first processing result and the second processing result may be transmitted to the node in the lower layer separately. When obtaining any processing result, the node in the $i^{th}$ layer may transmit it to the node in the lower layer without waiting for other processing results. In some exemplary embodiments, the first processing result and the second processing result may also be transmitted by the node in the $i^{th}$ layer to the node in the lower layer simultaneously.

Figure 6:
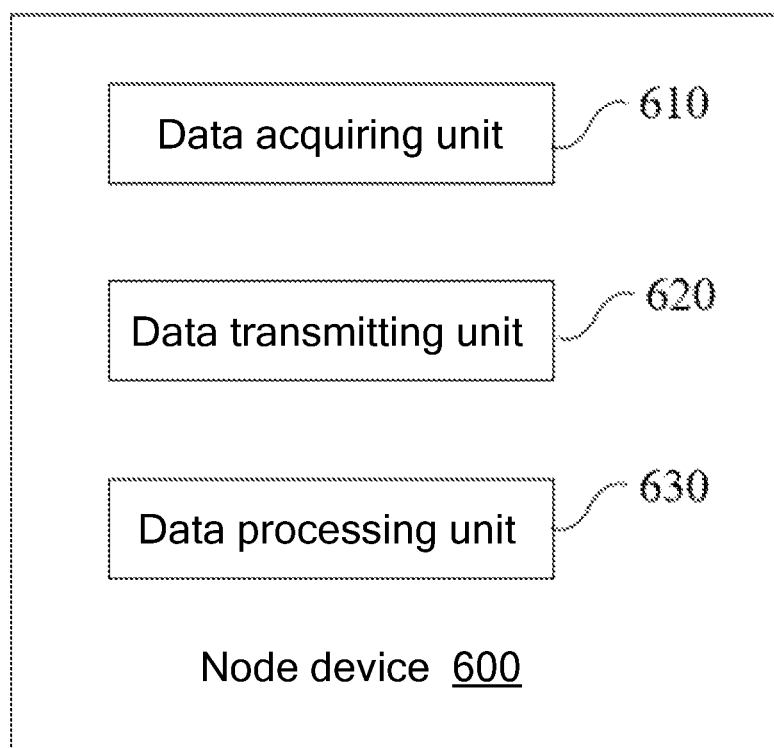
FIG. 6 is a schematic diagram of a node device according to some exemplary embodiments of the present disclosure.

FIG. 6 is a schematic diagram of a node device 600 of the present disclosure. The node device 600 may be a device included in any node in the distributed computing network. The node device 600 may include a data acquiring unit 610, a data transmitting unit 620, and a data processing unit 630.

For the node device in the $i^{th}$ layer of the distributed computing network, the data acquiring unit 610 may be configured to receive a data processing task corresponding to the $i^{th}$ layer and transmitted from a node in a lower layer; and the data processing unit 630 may be configured to complete a data processing task $T_i$, where the data processing task $T_i$ is at least one part of the data processing task corresponding to the $i^{th}$ layer.

The data transmitting unit 620 may transmit, to the node in the lower layer, a data processing result of the at least one part of the data processing task corresponding to the $i^{th}$ layer; and transmit, to a node in an upper layer, a remaining data processing task of the data processing task corresponding to the $i^{th}$ layer, such that a process of the data processing task meets a preset condition.

An example of the present disclosure further provides a computer readable storage medium, where the computer readable storage medium stores a computer program. When the computer program is executed by the processor, the steps of the distributed computing network described above may be performed.

In summary, after reading this detailed disclosure, those skilled in the art can understand that the foregoing detailed disclosure may be presented by way of example only, and may be non-limiting. Although there is no clear description, those skilled in the art can understand that the present disclosure intends to cover various reasonable changes, improvements and modifications of the exemplary embodiments. These changes, improvements and modifications are intended to be proposed in the present disclosure and are within the spirit and scope of the exemplary embodiments of the present disclosure.

In addition, some specific terms in the present disclosure have been used to describe the exemplary embodiments of the present disclosure. For example, "one embodiment", "an embodiment" and/or "some embodiments" mean that a specific feature, structure, or characteristic described in combination with the exemplary embodiment may be included in at least one exemplary embodiment of the present application. Therefore, it should be emphasized and should be understood that two or more references to "an embodiment" or "one embodiment" or "an alternative embodiment" in various parts of this specification do not necessarily all refer to the same exemplary embodiment. In addition, specific feature, structure, or characteristic may be appropriately combined in one or more exemplary embodiments of the present application.

It should be understood that in the foregoing description of the exemplary embodiments of the present application, to help understand a feature, and for the purpose of simplifying the present application, the present application sometimes combines various features in a single exemplary embodiment, a drawing, or description thereof. Alternatively, the present disclosure disperses various features in multiple exemplary embodiments of the present disclosure. However, this does not mean that the combination of these features is necessary. It is entirely possible for those skilled in the art to extract some of the features as a single exemplary embodiment for understanding when reading the present disclosure. In other words, the exemplary embodiments in the present disclosure can also be understood as an integration of multiple sub-embodiments. The content of each sub-embodiment is also true when it is less than all the characteristics of a single previously disclosed exemplary embodiment.

In some exemplary embodiments, numbers expressing quantities or properties and used to describe and claim protection of certain exemplary embodiments of the present disclosure should be understood as modified by the terms "about", "approximately" or "substantially" in some cases. For example, unless otherwise stated, "about", "approximately" or "substantially" may mean a ±20% variation of the value described. Therefore, in some exemplary embodiments, the numerical parameters listed in the written description and appended claims are approximations, which may vary according to the desired properties that a specific exemplary embodiment attempts to achieve. In some exemplary embodiments, the numerical parameters should be interpreted based on the number of significant figures reported and by applying common rounding techniques. Although some exemplary embodiments described in the present disclosure list a wide range of numerical ranges and the parameters are approximate values, the specific examples all list numerical values as precise as possible.

Each patent, patent application, patent application publication and other materials cited herein, such as articles, books, specifications, publications, documents, articles and the like, may be incorporated herein by reference. The entire content used for all purposes, except for any related litigation document history, may be inconsistent or conflicting with this document, or any identical litigation document that may have restrictive influence on the broadest scope of the claims' history. Those are associated with this document now or in the future. For example, if the description, definition, and/or use of terms in any associated materials contained herein is inconsistent with or in conflict with that in this document, the terms in this document shall prevail.

Finally, it should be understood that the exemplary embodiment of the application disclosed herein is an explanation of the principle of the exemplary embodiment of the application. Other modified embodiments are also within the scope of the present disclosure. Therefore, the exemplary embodiments disclosed in the present disclosure are merely examples rather than limitations. Those skilled in the art can adopt alternative configurations according to the exemplary embodiments of the present application to implement the disclosure in the present application. Therefore, the exemplary embodiments of the present application are not limited to those exactly described in the application.

What is claimed is:

1. A distributed computing network, comprising:
a plurality of nodes connecting through an n-layer network connection, wherein in the network connection a layer with larger layer number is a higher layer than a layer with a smaller layer number and a root node is the highest layer, when the distributed computing network receives a data processing task, a node in an $i^{th}$ layer is configured to:
receive a data processing task corresponding to the $i^{th}$ layer and transmitted from a node in a lower layer of the $i^{th}$ layer;
complete a data processing task $T_i$, wherein the data processing task $T_i$ is at least one part of the data processing task corresponding to the $i^{th}$ layer;
transmit, to the node in the lower layer of the $i^{th}$ layer, a data processing result of the at least one part of the data processing task corresponding to the $i^{th}$ layer; and
transmit, to a node in an upper layer of the $i^{th}$ layer, a remaining data processing task of the data processing task corresponding to the $i^{th}$ layer, such that a process of the data processing task meets a preset condition;
wherein n is a positive integer greater than 1, and i is any integer from 1 to n, the preset condition includes that time for the node in the $i^{th}$ layer to complete the data processing task $T_i$ is not greater than a sum of upper layer transmission time and upper layer processing time,
the upper layer transmission time includes a hardware delay for transmitting the data processing task $T_i$ and corresponding processing result of the data processing task $T_i$ between the node in the $i^{th}$ layer and a node in at least one layer above the node in the $i^{th}$ layer, and
the upper layer processing time includes time for the node in the at least one layer above the node in the $i^{th}$ layer to process the data processing task $T_i$.

2. The distributed computing network according to claim 1, wherein the node in the $i^{th}$ layer is further configured to:
receive at least one part of a calculation result of the remaining data processing task transmitted from the node in the upper layer; and
transmit, to the node in the lower layer, the at least one part of the calculation result of the remaining data processing task.

3. The distributed computing network according to claim 1, further comprising:
the root node connecting to the plurality of nodes through the network connection,
wherein the distributed computing network dynamically connects, through the network connection, to at least one mobile device as at least one mobile temporal node of the distributed computing network.

4. The distributed computing network according to claim 3, wherein the at least one mobile temporal node includes at least one mobile device located within a geographic range of the network connection of the plurality of nodes.

5. The distributed computing network according to claim 3, wherein the plurality of nodes and the at least one mobile temporal node includes a 5G wireless network communication device; and
the network connection is wireless 5G connection.

6. The distributed computing network according to claim 3, wherein
the at least one mobile device includes an autonomous vehicle transmitting the data processing task to the distributed computing network, the data processing task including an autonomous-driving-data processing task; and the plurality of nodes includes:
- at least one base station receiving the autonomous-driving-data processing task from the autonomous vehicle, and
- at least one equipment room, located at an upper layer of the at least one base station and receiving the data processing task transmitted from the at least one base station.

7. The distributed computing network according to claim 6, wherein the data processing task $T_i$ processed by the base station includes at least one of remote-control and positioning of the autonomous vehicle.

8. The distributed computing network according to claim 6, wherein the root node includes a cloud server, and the cloud server is responsible for processing data statistics in the data processing task.

9. The distributed computing network according to claim 1, wherein
the data processing task corresponds to a preset processing response time limit;
the preset condition includes that a processing time of the data processing task in the distributed computing network is within the processing response time limit.

10. A data processing method, comprising:
receiving, by a node in an $i^{th}$ layer of a distributed computing network, a data processing task corresponding to the $i^{th}$ layer and transmitted from a node in a lower layer, wherein the distributed computing network including a plurality of nodes connected through an n-layer network connection, in the network connection a layer with larger layer number is a higher layer than a layer with a smaller layer number and a root node is the highest layer;
completing, by the node in the $i^{th}$ layer, a data processing task $T_i$, wherein the data processing task $T_i$ is at least one part of the data processing task corresponding to the $i^{th}$ layer;
transmitting, by the node in the $i^{th}$ layer, to the node in the lower layer of the $i^{th}$ layer, a data processing result of the at least one part of the data processing task corresponding to the $i^{th}$ layer; and
transmitting, by the node in the $i^{th}$ layer, to a node in an upper layer of the $i^{th}$ layer, a remaining data processing task of the data processing task corresponding to the $i^{th}$ layer, such that a process of the data processing task meets a preset condition;
wherein n is a positive integer greater than 1, and i is any integer from 1 to n, the preset condition includes that time for the node in the $i^{th}$ layer to complete the data processing task $T_i$ is not greater than a sum of upper layer transmission time and upper layer processing time,
the upper layer transmission time includes a hardware delay for transmitting the data processing task $T_i$ and corresponding processing result of the data processing task $T_i$ between the node in the $i^{th}$ layer and a node in at least one layer above the node in the $i^{th}$ layer, and
the upper layer processing time includes time for the node in the at least one layer above the node in the $i^{th}$ layer to process the data processing task $T_i$.

11. The method according to claim 10, further comprising:
receiving, by the node in the $i^{th}$ layer, at least one part of a calculation result of the remaining data processing task transmitted from the node in the upper layer; and
transmitting, by the node in the $i^{th}$ layer, to the node in the lower layer, the at least one part of the calculation result of the remaining data processing task.

12. The method according to claim 10, wherein the root node connects to the plurality of nodes through the network connection; and
the distributed computing network dynamically connects, through the network connection, to at least one mobile device as at least one mobile temporal node of the distributed computing network.

13. The method according to claim 12, wherein the at least one mobile temporal node includes at least one mobile device located within a geographic range of the network connection of the plurality of nodes.

14. The method according to claim 12, wherein the plurality of nodes and the at least one mobile temporal node include a 5G wireless network communication device; and
the network connection is wireless 5G connection.

15. The method according to claim 12, wherein
the at least one mobile device includes an autonomous vehicle transmitting the data processing task to the distributed computing network, the data processing task includes an autonomous-driving-data processing task;
the plurality of nodes includes:
- at least one base station receiving the autonomous-driving-data processing task from the autonomous vehicle; and
- at least one equipment room, located at an upper layer of the at least one base station, receiving the data processing task from the at least one base station.

16. The method according to claim 15, wherein the data processing task $T_i$ processed by the base station includes at least one of remote-control and positioning of the autonomous vehicle.

17. The method according to claim 15, wherein the root node includes a cloud server, and the cloud server is responsible for processing data statistics in the data processing task.

18. The method according to claim 10, wherein
the data processing task corresponds to a preset processing response time limit;
the preset condition includes that a processing time of the data processing task in the distributed computing network is within the processing response time limit.

* * * * *